W. T. HENSLEY.
COIL FOR DYNAMO ELECTRIC MACHINES.
APPLICATION FILED JAN. 10, 1908.

957,882.
Patented May 17, 1910.

WITNESSES:
Fred H. Miller
R. J. Dearborn

INVENTOR
William T. Hensley
BY
Hensley & Carr
ATTORNEY

UNITED STATES PATENT OFFICE.

WILLIAM T. HENSLEY, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

COIL FOR DYNAMO-ELECTRIC MACHINES.

957,882.  Specification of Letters Patent.  Patented May 17, 1910.

Application filed January 10, 1908. Serial No. 410,147.

*To all whom it may concern:*

Be it known that I, WILLIAM T. HENSLEY, a citizen of the United States, and a resident of Wilkinsburg, in the county of Allegheny and State of Pennsylvania, have invented a new and useful Improvement in Coils for Dynamo-Electric Machines, of which the following is a specification.

My invention relates to coils for dynamo-electric machines, and it has special reference to coils of the so-called diamond type which are adapted to form parts of wave windings for use with machines of the commutator type.

The object of my invention is to provide a coil of the class above indicated that shall be simple in construction and the strands or turns of which shall be advantageously disposed.

When direct current electric motors and generators, or other dynamo-electric machines having commutators, are provided with complete wave windings having coils of the diamond type, the end-connecting portions of the assembled coils are close together and form two layers, one within the other. In the prior art, the coil leads were so related to the remainder of the coil that at least one of them was necessarily brought radially inward or outward from the inside of the layers referred to above. The leads were then bent in opposite directions and carried to the commutator bars along any suitable lines following the general direction of the axis of the machine.

According to my present invention, the short radial portion of the leads which was usually crowded between adjacent coils is entirely avoided, the coil itself and the method of winding the same being such that the leads are brought out from, and form a continuation of, the innermost and outermost conductors of the coils and, consequently, may be carried directly to the proper commutator bars.

Figure 1:
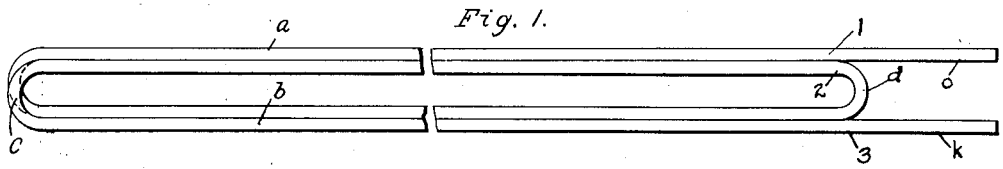
Figure 2:
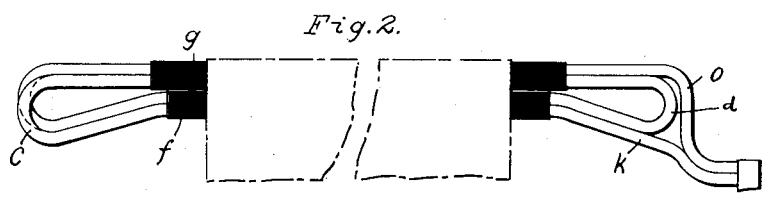
Figure 3:
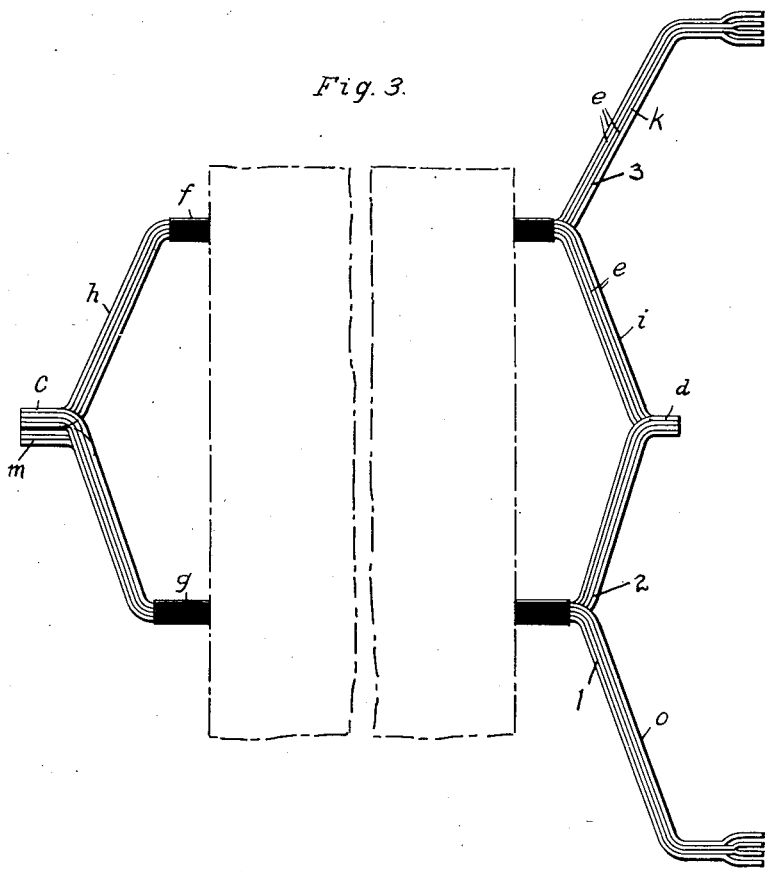

In the accompanying drawings, Figure 1 is a view of a partially formed coil in an early stage of its formation. Fig. 2 is a side elevation of a complete coil assembled in the core of a dynamo-electric machine in the usual manner, the core being shown in broken lines and developed into a single plane, and Fig. 3 is a plan view of the parts disclosed in Fig. 2.

Referring to the drawings, the coil here illustrated comprises a complete or closed multi-strand turn $a$ extending from a point marked 1 to a point marked 2 and an open multi-strand turn $b$ extending from the point 2 to a point marked 3. The closed turn $a$ has offset bends $c$ and $d$ and the open turn $b$ has an offset bend $m$. The strands $e$ of which the coil is wound are side by side and the turns of the coil are one above another, except at the offset bends $c$ and $m$, where they are side by side. The general form of the coil is that of the well known diamond type having parallel straight portions $f$ and $g$, which are located in the usual core slots of a dynamo-electric machine, and substantially V-shaped end-connecting portions $h$ and $i$ which embody the offset bends $c$, $d$, and $m$ and join the extremities of the straight portions $f$ and $g$ which project from the core slots. The coil leads $k$ and $o$ project from the straight portions $f$ and $g$ and at the same end of the core of the machine, the lead $k$ forming a continuation of the undermost turn of the straight portion $f$ and the lead $o$ forming a continuation of the uppermost turn of the straight portion $g$. These leads may, of course, extend to the commutator of the machine in any suitable manner, but usually form, in a wave winding, an angle with the straight portion of the coil which corresponds to that of the adjacent portion of the end-connector. By employing a coil of the form above indicated, the cross-over, which usually occurs between the lead and the end portion of the closed turn and produces an undesirable radial section which is crowded between portions of adjacent coils at the commutator end of the core, is located at the opposite end of the core where it is readily taken care of without producing any undesirable results.

It will be understood that the number and shape of the conductors may be varied without departing from the spirit of my invention and I desire, therefore, that only such limitations shall be imposed as are indicated in the appended claims.

I claim as my invention:

1. A coil for dynamo-electric machines, comprising a plurality of multi-strand turns each having an offset bend at one end, the strands being side-by-side, and the turns being one above another, except at said offset bends, where they are side-by-side.

2. A coil for dynamo-electric machines, comprising two multi-strand turns each having an offset bend at one end and located one above another, except at said offset bends, where they are side-by-side.

3. A coil for dynamo-electric machines, having a plurality of turns each of which comprises a plurality of side-by-side strap conductors and has an offset bend, the turns being disposed one above another, except at the offset bends, where they are disposed side-by-side.

4. A substantially hexagonal coil for dynamo-electric machines, having two relatively long, substantially parallel and equal sides, a plurality of turns of wire or strap conductor which have corresponding offset bends, the turns being disposed one above another, except at said offset bends, where they are disposed side-by-side, and terminal portions that extend outwardly from laterally opposite corners of the coil.

5. A coil for dynamo-electric machines having terminal portions and comprising a plurality of multi-strand turns, each turn having a corresponding offset bend at one end, the turns being disposed one above another except at the offset bends where they are side-by-side and the terminal portions being connected respectively to the uppermost and the undermost turn of the coil.

6. A substantially diamond shaped armature coil for dynamo-electric machines having two substantially parallel sides, V shaped end portions and integral terminal portions, and comprising a plurality of multi-strand turns, each turn having a corresponding offset bend at one end, the turns being disposed one above another except at the offset bends where they are side-by-side and the terminal portions being, respectively, continuations of the uppermost and the undermost turn of the coil.

7. A coil for dynamo-electric machines comprising a closed multi-strand turn having an offset bend at each end and an open multi-strand turn having an offset bend at one end, the turns being disposed one above another except at the corresponding offset bends where they are disposed side-by-side.

In testimony whereof, I have hereunto subscribed my name this 31st day of Dec., 1907.

WILLIAM T. HENSLEY.

Witnesses:
   R. J. DEARBORN,
   BIRNEY HINES.